US010782179B2

(12) United States Patent
Daw Perez et al.

(10) Patent No.: US 10,782,179 B2
(45) Date of Patent: Sep. 22, 2020

(54) ON-BOARD UNIT LOAD DEVICE WEIGHT ESTIMATION

(71) Applicant: Goodrich Corporation, Charlotte, NC (US)

(72) Inventors: Zamira A. Daw Perez, Albany, CA (US); Alessandro Pinto, Kensington, CA (US); Richa Varma, El Cerrito, CA (US); Binu M. Nair, San Mateo, CA (US); Xiaobin Zhang, Morgin Hill, CA (US); Aaron J Roberts, Jamestown, ND (US); Scott Harms, Ypsilanti, ND (US)

(73) Assignee: Goodrich Corporation, Charlotte, NC (US)

( * ) Notice: Subject to any disclaimer, the term of this patent is extended or adjusted under 35 U.S.C. 154(b) by 236 days.

(21) Appl. No.: 16/167,183

(22) Filed: Oct. 22, 2018

(65) Prior Publication Data

US 2020/0124463 A1 Apr. 23, 2020

(51) Int. Cl.
*B64D 9/00* (2006.01)
*G01G 19/12* (2006.01)
*G01G 19/414* (2006.01)

(52) U.S. Cl.
CPC ............. *G01G 19/12* (2013.01); *B64D 9/003* (2013.01); *G01G 19/414* (2013.01); *B64D 2009/006* (2013.01)

(58) Field of Classification Search
CPC .. B64D 9/003; B64D 2009/006; G01G 19/12; G01G 19/414; G01G 19/4148
See application file for complete search history.

(56) References Cited

U.S. PATENT DOCUMENTS

| | | | | | |
|---|---|---|---|---|---|
| 4,225,926 | A | * | 9/1980 | Wendt | B64D 9/00 177/136 |
| 4,548,079 | A | * | 10/1985 | Klatt | B60T 8/58 73/865 |
| 5,105,392 | A | * | 4/1992 | Stringer | G01B 11/002 367/99 |
| 5,215,154 | A | * | 6/1993 | Kirby | G01G 19/03 177/136 |
| 5,266,810 | A | * | 11/1993 | Murphy | G01V 8/20 250/222.1 |

(Continued)

*Primary Examiner* — Randy W Gibson
(74) *Attorney, Agent, or Firm* — Snell & Wilmer L.L.P.

(57) ABSTRACT

A system for estimating mass of a ULD while on-board a vessel includes a system controller energizing one or more PDUs in communication with a conveyance surface of the vessel, the PDUs applying first and second forces to the ULD and transmitting first and second force parameters to a system integrator, one or more sensors measuring first and second accelerations of the ULD when the ULD moves into one or more sensing zones as a result of the forces and transmits first and second acceleration parameters to the system integrator, and the system integrator, which receives the first and second force parameters, and the first and second acceleration parameters, and calculates the mass of the ULD while the ULD is on-board the vessel by performing regression analysis on ordered pairs including the first force parameter and the first acceleration parameter, and the second force parameter and the second acceleration parameter.

20 Claims, 6 Drawing Sheets

(56) References Cited

U.S. PATENT DOCUMENTS

| | | | | |
|---|---|---|---|---|
| 5,393,939 | A * | 2/1995 | Nasuta, Jr. | G01G 11/003 |
| | | | | 177/145 |
| 5,877,455 | A * | 3/1999 | Kyrtsos | G01G 19/035 |
| | | | | 177/1 |
| 5,973,273 | A * | 10/1999 | Tal | G01G 19/08 |
| | | | | 177/1 |
| 6,137,656 | A * | 10/2000 | Levi | G11B 5/6005 |
| | | | | 360/235.4 |
| 8,109,702 | B2 | 2/2012 | Stegmiller et al. | |
| 8,153,911 | B2 * | 4/2012 | Turner | G01G 19/4148 |
| | | | | 177/1 |
| 8,373,078 | B2 * | 2/2013 | Madhavarao | G01G 23/3742 |
| | | | | 177/136 |
| 10,005,564 | B1 | 6/2018 | Bhatia et al. | |
| 10,569,976 | B2 * | 2/2020 | Lewis | B65G 67/04 |
| 10,584,001 | B2 * | 3/2020 | Philipp | G01G 19/22 |
| 2015/0241209 | A1 * | 8/2015 | Jouper | G01B 17/00 |
| | | | | 702/156 |
| 2019/0100379 | A1 * | 4/2019 | Hatayan | G01S 7/4802 |

* cited by examiner

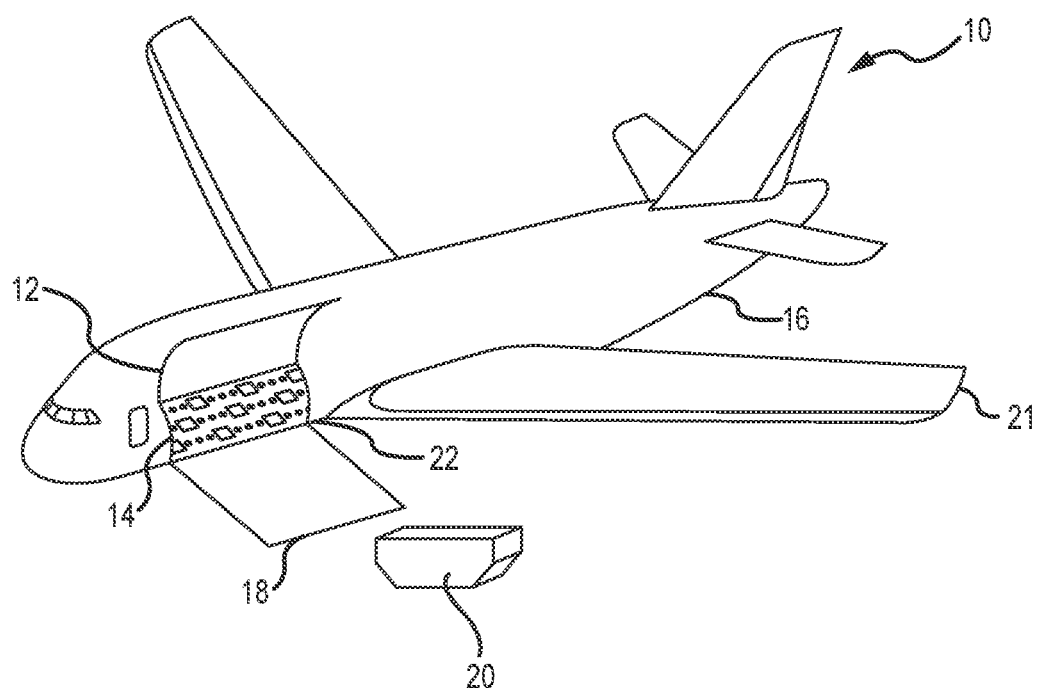
FIG.1
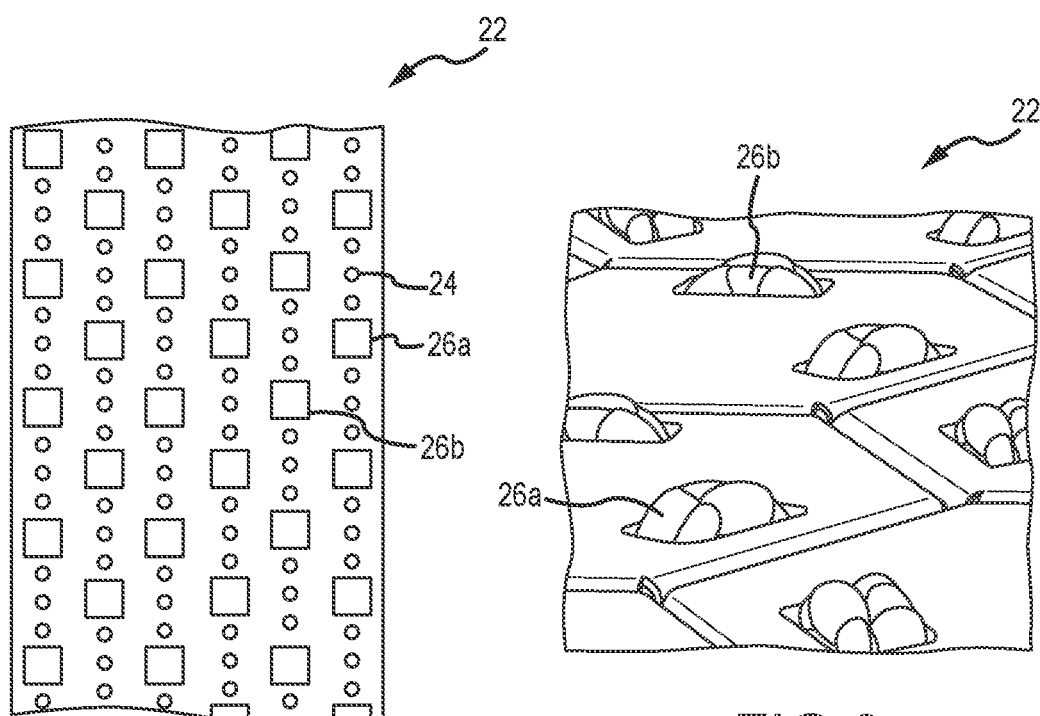
FIG.2
FIG.3

ON-BOARD UNIT LOAD DEVICE WEIGHT ESTIMATION

FIELD

The present disclosure relates to cargo handling, and more specifically, to weight estimation in cargo handling systems and methods.

BACKGROUND

Various cargo handling systems and methods include balls, plates, rollers, slides, and/or tracks (herein referred to as conveyance rollers) that span a conveyance surface (herein referred to as a conveyance plane) of a storage area. Various containerized cargo and/or pallets (herein referred to as unit load devices (ULDs)) may be moved about the conveyance surface via various power drive units (PDUs) and/or the conveyance rollers, for which the weight of the ULDs may be unknown in the absence of weighing them— but which take time, create bottlenecks, create slowdowns, and/or are impractical when weighed on conventional scales.

SUMMARY

In various embodiments, a system for estimating a mass of a unit load device while on-board a vessel configured to transport the unit load device includes at least the following: a system controller configured to energize at least one power drive unit in communication with a conveyance surface of the vessel; wherein the at least one power drive unit having a controller and a motor is configured to apply a first force to the unit load device and transmit a first force parameter in proportion to the first force to a system integrator, and the at least one power drive unit configured to apply a second force to the unit load device and transmit a second force parameter in proportion to the second force to the system integrator; at least one sensor configured to measure a first acceleration of the unit load device in response to the unit load device moving into a sensing zone disposed about the conveyance surface of the vessel as a result of the first force and transmit a first acceleration parameter in proportion to the first acceleration to the system integrator, the at least one sensor further configured to measure a second acceleration of the unit load device in response to the unit load device moving into the sensing zone disposed about the conveyance surface of the vessel as a result of the second force and transmit a second acceleration parameter in proportion to the second acceleration to the system integrator; and the system integrator having a processor and a memory, the system integrator configured in electronic communication with the at least one power drive unit to receive the first force parameter and the second force parameter, and the system integrator also configured in electronic communication with the at least one sensor to receive the first acceleration parameter and the second acceleration parameter; wherein the system integrator is configured to calculate the mass of the unit load device while the unit load device is on-board the vessel by performing regression analysis on ordered pairs including the first force parameter and the first acceleration parameter, and the second force parameter and the second acceleration parameter.

In various embodiments: at least one of the first force parameter includes a first electrical current applied to the at least one power drive unit by the system controller and the second force parameter includes a second electrical current applied to the at least one power drive unit by the system controller; and/or at least one of the first force parameter includes a first electrical voltage applied to the at least one power drive unit by the system controller and the second force parameter includes a second electrical voltage applied to the at least one power drive unit by the system controller; and/or the at least one sensor includes at least one of a camera, a video capture device, a radar, a light sensor, a depth sensor, a position sensor, an infrared sensor, an ultrasound sensor, a light detection and ranging sensor, and a three-dimensional sensor; and/or the regression analysis is a single variable regression analysis; and/or the regression analysis is a multi-variable regression analysis; and/or the at least one power drive unit includes the system integrator; and/or the vessel includes an aircraft.

In various embodiments, a method of estimating a mass of a unit load device while on-board a vessel configured to transport the unit load device includes at least the following: receiving, at a system integrator, a first force parameter in proportion to a first force applied to the unit load device by at least one power drive unit in communication with a conveyance surface of the vessel; receiving, at the system integrator, a second force parameter in proportion to a second force applied to the unit load device by the at least one power drive unit in communication with the conveyance surface of the vessel; receiving, at the system integrator, a first acceleration parameter in proportion to a first acceleration of the unit load device in response to the unit load device moving into a sensing zone disposed about the conveyance surface of the vessel as a result of the first force; receiving, at the system integrator, a second acceleration parameter in proportion to a second acceleration of the unit load device in response to the unit load device moving into the sensing zone disposed about the conveyance surface of the vessel as a result of the second force; and calculating, by the system integrator, the mass of the unit load device while the unit load device is on-board the vessel by performing regression analysis on ordered pairs including the first force parameter and the first acceleration parameter, and the second force parameter and the second acceleration parameter.

In various embodiments: a system response is generated if the mass of the unit load device does not match an expected mass of the unit load device; and/or the system response includes at least one of rejecting the unit load device from the conveyance surface, removing the unit load device from the conveyance surface, re-positioning the unit load device on the conveyance surface, and generating an alert based on the mass of the unit load device; and/or the regression analysis is a single variable regression analysis or a multi-variable regression analysis; and/or the regression analysis is performed before the unit load device is placed in a stowage position on the conveyance surface of the vessel; and/or the vessel includes an aircraft.

In various embodiments, a method of estimating a mass of a unit load device while on-board a vessel configured to transport the unit load device includes at least the following: a non-transitory memory configured to store instructions; and a processor in electronic communication with the memory, the processor configured to, in accordance with the instructions, receive a first force parameter in proportion to a first force applied to the unit load device by at least one power drive unit in communication with a conveyance surface of the vessel; receive a second force parameter in proportion to a second force applied to the unit load device by the at least one power drive unit in communication with the conveyance surface of the vessel; receive a first acceleration parameter in proportion to a first acceleration of the unit load device in response to the unit load device moving into a sensing zone disposed about the conveyance surface of the vessel as a result of the first force; receive a second acceleration parameter in proportion to a second acceleration of the unit load device in response to the unit load device moving into the sensing zone disposed about the conveyance surface of the vessel as a result of the second force; and calculate the mass of the unit load device while the unit load device is on-board the vessel by performing regression analysis on ordered pairs including the first force parameter and the first acceleration parameter, and the second force parameter and the second acceleration parameter.

In various embodiments: a system response is generated if the mass of the unit load device does not match an expected mass of the unit load device; and/or the system response includes at least one of rejecting the unit load device from the conveyance surface, removing the unit load device from the conveyance surface, re-positioning the unit load device on the conveyance surface, and generating an alert based on the mass of the unit load device; and/or the regression analysis is a single variable regression analysis or a multi-variable regression analysis; and/or the regression analysis is performed before the unit load device is placed in a stowage position on the conveyance surface of the vessel; and/or the vessel includes an aircraft.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures, and in which:

FIG. 1 is a perspective view of a vessel, such as an aircraft, configured to be loaded with cargo, such as one or more unit load devices (ULDs), in accordance with various embodiments;

FIG. 2 is a simplified top view of a part of a conveyance surface within the vessel of FIG. 1, in accordance with various embodiments;

FIG. 3 is also a simplified top view of a part of a conveyance surface, in accordance with various embodiments;

Figure 4:
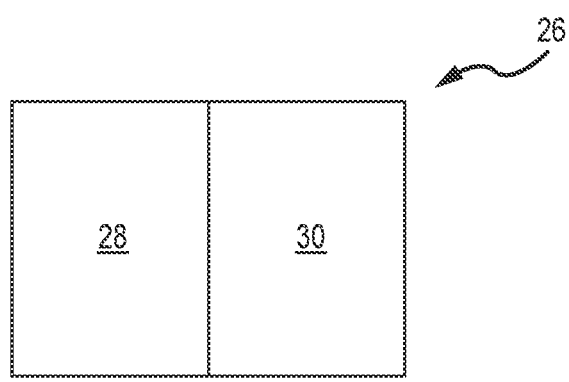
FIG. 4 is a block view of a power drive unit (PDU) comprising a controller and a motor, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular elements includes plural elements, and any reference to more than one element may include singular elements. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. An X-Y-Z or other axis may be provided throughout the figures for ease of illustration and is contemplated herein.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling").

In various embodiments, and with reference now to FIG. 1, a representative vessel, such as an aircraft 10, has an openable and closeable cargo load door 12 illustrated in an open position to expose a cargo opening 14 within a fuselage 16 of the aircraft 10. In various embodiments, a cargo ramp 18 communicates with the cargo opening 14 in order to be able to load and unload cargo, such as a unit load device(s) (ULD(s)) 20, into and/or out of the vessel.

In various embodiments, the ULDs 20 are specially configured pallets and/or containers designed to fit securely within the fuselage 16 of the aircraft 10 for transportation. In various embodiments, the ULDs 20 are standardized in various dimensions and/or shapes, such as 125 inches (3.15 meters) long by 88 inches (2.24 meters) or 96 inches (2.44 meters) wide. In various embodiments, the ULDs 20 are irregularly shaped and/or non-uniformly shaped. Depending on the content of a ULD 20, they may vary, including substantially, in mass and/or weight.

In various embodiments, a scissors lift (and/or the like) is used in addition to and/or instead of the cargo ramp 18, particularly in order to communicate with the cargo opening 14 in the fuselage 16 of the aircraft 10. In various embodiments, the cargo opening 14 is, referring generally, in at least one of a side (as shown), a rear, a top, and/or a bottom of the fuselage 16 of the aircraft 10, including forward and/or aft of the aircraft wings 21, and/or in other suitable locations as well.

In various embodiments, a ULD 20 is loaded with cargo other than within the immediate vicinity of the vessel and/or at least not while within the cargo opening 14. Once the ULD 20 is loaded with cargo items, it is transferred onto the vessel, such as the aircraft 10, through the cargo load door 12 and/or into the cargo opening 14. Once within the cargo opening 14, the ULD 20 is moved within the cargo opening 14 to a final stowage position within the fuselage 16 of the vessel.

Referring now also to FIGS. 1-2, an internal surface area within the fuselage 16 comprises a conveyance surface 22 (also referred to as a conveyance plane and/or cargo deck) that comprises various conveyance rollers 24 having one or more various balls, plates, rollers, slides, tracks, etc. and spanning part, most, and/or all of the conveyance surface 22. While multiple conveyance rollers 24 are depicted in FIGS. 1-2, for example, only one conveyance roller 24 is labelled for ease of illustration in FIG. 2. In various embodiments, the conveyance rollers 24 are arranged in various columns and/or rows and disposed along the conveyance surface 22 for disposing, loading, placing, and/or unloading the various ULDs 20 into and/or out of the vessel. In various embodiments, the aircraft 10 has more than one (e.g., two or three or more) multiple landings, levels, and/or stories of the conveyance surfaces 22 within the fuselage 16 of the aircraft 10.

In various embodiments, a part or entirety of the conveyance surface 22 is flat. In various embodiments, a part or entirety of the conveyance surface 22 is subject to one or more inclines and/or declines in reference to the aircraft 10 when the aircraft 10 is parked and/or flying at a constant altitude and/or with zero pitch. In various embodiments, a part or entirety of the conveyance surface is 22 at least one of flat and/or subject to one or more inclines and/or declines.

In various embodiments, a part or entirety of the conveyance surface 22 is continuous over the storage area. In various embodiments, a part or entirety of the conveyance surface 22 is discontinuous over the storage area, such as interrupted by obstructions, such as bulkheads and/or the like. In various embodiments, a part or entirety of the conveyance surface 22 is at least one of continuous over the storage area and/or discontinuous over the storage area, such as interrupted by obstructions, such as bulkheads and/or the like.

In various embodiments, a part or entirety of the conveyance surface 22 at least one of abuts, intersects, and/or joins a part or entirety of another conveyance surface 22 (only one conveyance surface 22 is shown in FIGS. 1-3 for ease of illustration).

In various embodiments, cargo handling systems and methods, such as those disclosed herein, are used to load, move, stow, support, and/or unload cargo about the conveyance surface 22. In various embodiments, the conveyance rollers 24 rollably load, move, stow, support, and/or unload the cargo (e.g., the ULD 20) about the conveyance surface 22.

In various embodiments, the cargo handling systems and methods described herein are used to calculate and/or estimate a mass (e.g., a weight) of the ULDs 20 without weighing them.

In various embodiments, the ULDs 20 are moved, positioned, and/or re-located many times throughout the course of a day and/or other measure of time, including about the conveyance surface 22 of the aircraft 10.

In various embodiments, the conveyance rollers 24 are raised from the conveyance surface 22, such as to form elongated columns and/or rows of spherical balls (or the like), upon which the ULDs 20 glide by sitting on top of the conveyance surface 22 comprising the conveyance rollers 24.

In various embodiments, various power drive units (herein referred to as PDUs) 26 facilitate loading, moving, stowing, supporting, and/or unloading the ULDs 20 about the conveyance rollers 24 disposed within the conveyance surface 22, as elaborated upon herein. In various embodiments, the PDUs 26 are selectively energized to drive and/or propel the ULDs 20 in desired directions over the conveyance surface 22, including to and/or from various stowage positions within the vessel.

In various embodiments, a loading plan details movement and/or positioning of the ULDs 20 about the conveyance surface 22, which ensures safe handling (e.g., loading and/or unloading) and/or positioning of the ULDs 20. For example, if the ULDs 20 deviate from an anticipated, approved, and/or expected loading plan for the aircraft 10, dangerous, unbalanced, unequal, and/or unmitigated weight concerns impact flight operations and/or cause other complications if not properly accounted for and/or mitigated against.

In various embodiments, the loading plan details movement and/or positioning of the ULDs 20 about the conveyance surface 22 of the aircraft 10. In various embodiments, the loading plan takes into account the sizes, shapes, weights, and/or destinations of the various ULDs 20. If the loading plan is not followed and/or followed incorrectly, the unmitigated balance and/or flight performance of the aircraft 10 is compromised, in various embodiments.

Despite the importance of knowing accurate weights of the various ULDs 20, they are often not weighed and/or are weighed inaccurately. In various embodiments, the originator of the ULD 20 indicates its weight to an operator of the aircraft 10, but these indications are often inaccurate, including by as much as 25-300%, and/or by 50-200%, of the ULD's 20 actual weight. Accordingly, the ULDs 20 can be weighed, including individually, outside the fuselage 16 of the aircraft 10, though this is rarely done in practice, including due to bottlenecks and/or inefficiencies introduced when doing so, lack of available and/or reliable scale balances, etc.

Once on-board (i.e., within the fuselage 16) the aircraft 10, the ULD 20 is moved and/or positioned into a stowage position for the duration of, for example, a flight. As the ULD 20 is placed on-board the aircraft 10 but before it arranged and/or placed in its final stowage position, the systems and methods described herein estimate its mass (e.g., its weight) without weighing the ULD 20.

In various embodiments, multiple ULDs 20 are brought on-board the aircraft 10, including during one or more loading procedures, with each ULD 20 being placed in a respective stowage position about the conveyance surface 22. After the aircraft 10 reaches a destination, for example, one or more of the ULDs 20 are unloaded from aircraft 10 in a similar, but reversed, sequence as compared to the loading procedure, in various embodiments.

Once a ULD 20 is moved and/or positioned onto the conveyance surface 22, it can be moved manually along the conveyance surface 22 via the conveyance rollers 24 and/or via the PDUs 26, including to and/or from various stowage positions, in various embodiments.

In various embodiments, the ULDs 20 are electro-mechanically driven and/or propelled along the conveyance surface 22 by the one or more PDUs 26, each PDU 26 comprising a controller 28 and a motor 30, as representatively shown in FIG. 4. While multiple PDUs 26 are depicted in FIGS. 1-3, only a first PDU 26a and a second PDU 26b are labelled in FIGS. 2-3 for ease of illustration within the figures.

Referring generally, one or more of the PDUs 26 include a drive roller element that can be raised from a lowered position beneath the conveyance surface 22 to a raised position above the conveyance surface 22. In various embodiments, such PDUs 26 are referred to as self-lift PDUs 26. In their elevated positions, the drive roller elements contact and drive a bottom surface of the ULD 20, such as disposed towards the conveyance surface 22. Other types of PDUs 26, which can also be used in the embodiments of the present disclosure, are above the conveyance surface 22 all the time and/or held up, for example, by a spring. In various embodiments, such PDUs 26 are referred to as spring-lift PDUs 26.

In various embodiments, the PDUs 26 are distributed and/or oriented within the columns and/or rows of the conveyance rollers 24, including disposed about the conveyance surface 22. In various embodiments, many other suitable arrangements for the conveyance rollers 24 and/or the PDUs 26 are disposed about the conveyance surface 22, as contemplated and/or suited hereby. In various embodiments, the conveyance surface 22 comprises only the PDUs 26, without the conveyance rollers 24, such as shown in FIG. 3, in which again only a first PDU 26a and a second PDU 26b are labelled for ease of illustration within the figure.

In various embodiments, the PDUs 26 comprise a drive roller, such as an inflated tire, rigid roller having an elastometric outer surface, rotatable frame, turntable, etc. In various embodiments, friction and/or traction between the ULD 20 and the PDU 26 allow the ULDs 20 to be driven in commanded directions by the PDUs 26, by the system controller 32, and/or by other componentry.

In various embodiments, human and/or computer operators interface with the PDUs 26 to provide motive forces for the ULDs 20 (e.g., to facilitate moving the ULDs 20) along the conveyance surface 22. For example, and in accordance with various embodiments, the human and/or computer operators manipulate various control elements to selectively and electrically energize the PDUs 26 to move the ULDs 20 towards desired destinations. For example, a system controller 32 (shown in FIG. 5) provides motive force(s) for the ULD 20 of FIG. 1, including in cooperation with the conveyance rollers 24 and/or the PDUs 26. In various embodiments, the system controller 32 is mounted within an operator interface unit that is at least one of external, internal, and/or portable from the fuselage 16 of the aircraft 10. In various embodiments, the system controller 32 comprises, for example, an on/off switch and/or a joystick that, depending on the direction pushed, energizes certain ones of the PDUs 26 along the conveyance surface 22, causing groups of the drive roller elements to be elevated (if not already elevated) and/or spun in at least one of a first direction, a second direction opposite the first direction, and/or rotated in orientation relative to the conveyance surface 22. In various embodiments, the PDUs 26 remain energized as long as the joystick, for example, is held in a corresponding position. In response to releasing the joystick (or other), the selected set of the PDUs 26 are de-energized to stop movement of the ULD 20 about the conveyance surface 22, in various embodiments. In the embodiment of self-lift PDUs 26, the drive roller elements are returned to their retracted position beneath the conveyance surface 22. In the embodiment of spring-lift PDUs 26, the PDUs 26 remain biased in the upward position and brakes are applied to the conveyance rollers 24 to hold the ULDs 20 in place, such as in their stowage position(s).

In various embodiments, the ULDs 20 are loaded into positions on the conveyance surface 22 by an autonomous system controller 32. In such embodiments, the autonomous system controller 32 is programmed to selectively and electrically energize the various PDUs 26 corresponding to stowage positions for the ULDs 20.

Figure 5:
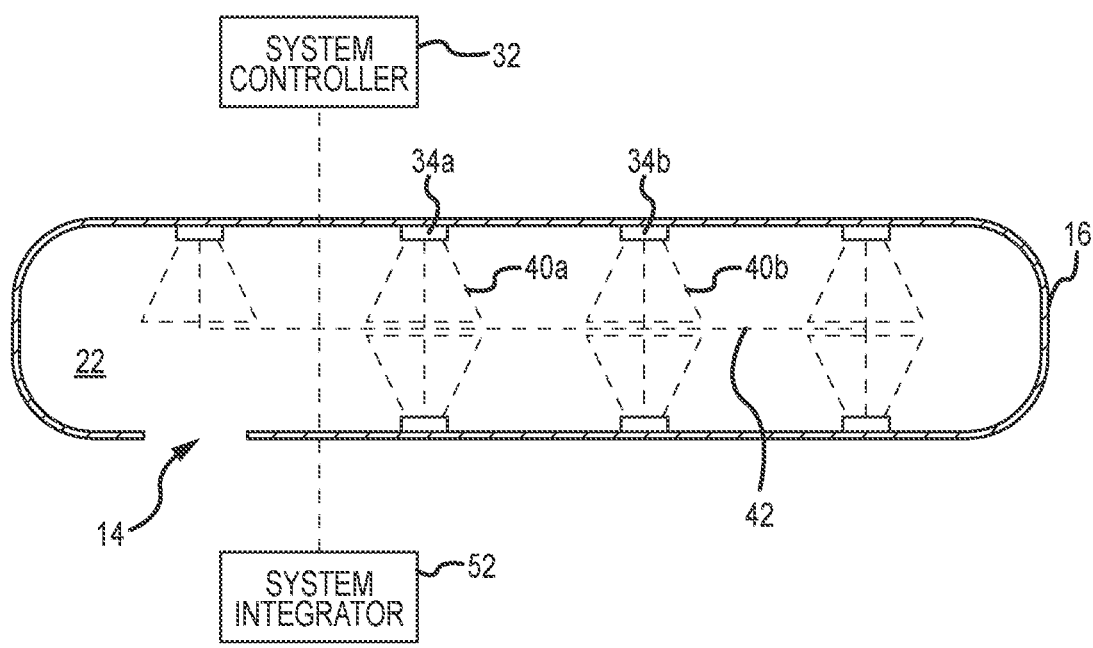
FIG. 5 is a top schematic view of a cargo handling system having a system controller and a system integrator, in accordance with various embodiments.
Figure 6:
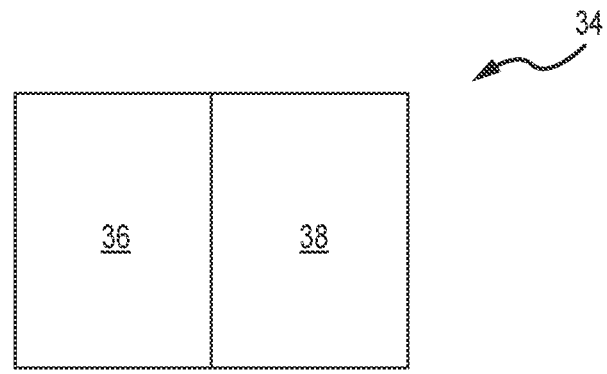
FIG. 6 is a block view of a sensor comprising a sensing component and a communication component, in accordance with various embodiments.

Referring again to FIG. 5, the aircraft 10 of FIG. 1 further comprises one or more sensors 34 disposed within the fuselage 16 of the aircraft 10. While multiple sensors 34 are depicted in FIG. 5, only a first sensor 34a and a second sensor 34b are labelled for ease of illustration within the figure. In various embodiments, each sensor 34 comprises a sensing component 36 and a communication component 38, as representatively shown in FIG. 6.

In various embodiments, each sensor 34 is configured to monitor and gather data during the cargo handling process(es). In various embodiments, the sensors 34 are located in suitable location(s) within the fuselage 16 of the aircraft 10 to facilitate the cargo handling process(es), including about the conveyance surface 22. For example, and in various embodiments, the sensors 34 are coupled to at least one of the floor, the ceiling, and/or the wall(s) of the fuselage 16 and disposed about the conveyance surface 22 and/or the storage area of the vessel. In various embodiments, the sensors 34 are dispersed throughout the fuselage 16 in reference to the conveyance surface 22 to create a distributed network of sensors 34.

In various embodiments, each sensor 34 comprises suitable components for monitoring and gathering data about the ULDs 20 during the cargo handling process(es). For example, in various embodiments, the sensing component 36 of the sensor 34 comprises one or more of of a camera, a video capture device, a radar, a light sensor, a depth sensor, a position sensor, an infrared sensor, an ultrasound sensor, a light detection and ranging sensor (LiDAR), and/or a three-dimensional sensor. In various embodiments, the sensor 34 comprises any suitable apparatus, hardware, and/or software capable of monitoring at least a portion of the conveyance surface 22, including the ULDs 20 positioned along the conveyance surface 22.

In various embodiments, each sensor 34 monitors a sensing zone 40 (shown in FIG. 5) of the conveyance surface 22 to generate data on the ULDs 20 passing within each sensing zone 40. While multiple sensing zones 40 are depicted in FIG. 5, only a first sensing zone 40*a* and a second sensing zone 40*b* are labelled for ease of illustration within the figure. In various embodiments, each sensing zone 40 comprises a suitable distance, such as, for example, approximately 1-5 feet (0.31-1.52 meters) from the sensor 34, and/or approximately 5-10 feet (1.52-3.05 meters) from the sensor 34, and/or approximately 10-15 feet (3.05-4.57 meters) from the sensor 34, and/or any other suitable sensing area from the sensor 34 in reference to the conveyance surface 22 and wherein approximately, as used in this context only, refers only to 1 foot (0.31 meters).

In various embodiments, each sensing zone 40 comprises a distinct area of the conveyance surface 22. In various embodiments, one sensing zone 40 overlaps with a second sensing zone 40, such as the first sensing zone 40*a* overlapping with the second sensing zone 40*b* (although the overlap is not shown in FIG. 5 for ease of illustration within the figure). In various embodiments, overlapping sensing zones 40 ensure sensing coverage and/or create redundancy in the monitored areas of the conveyance surface 22.

In various embodiments, each sensor 34 is configured to continuously monitor its corresponding sensing zone 40, monitor its sensing zone 40 at defined time intervals (e.g., every minute, etc.), and/or the like. In response to a ULD 20 entering a sensing zone 40, the sensor 34 determines a ULD 20 property, such as an acceleration of the ULD 20 within the sensing zone 40. In various embodiments, the sensor 34 monitors the ULD 20 according to the loading and/or unloading plan for the conveyance surface 22.

In various embodiments, the sensors 34 communicate with one another over a network 42 (shown in FIG. 5), including being able to identify, monitor, and/or track the ULDs 20 throughout their routing along the conveyance surface 22.

Figure 7:
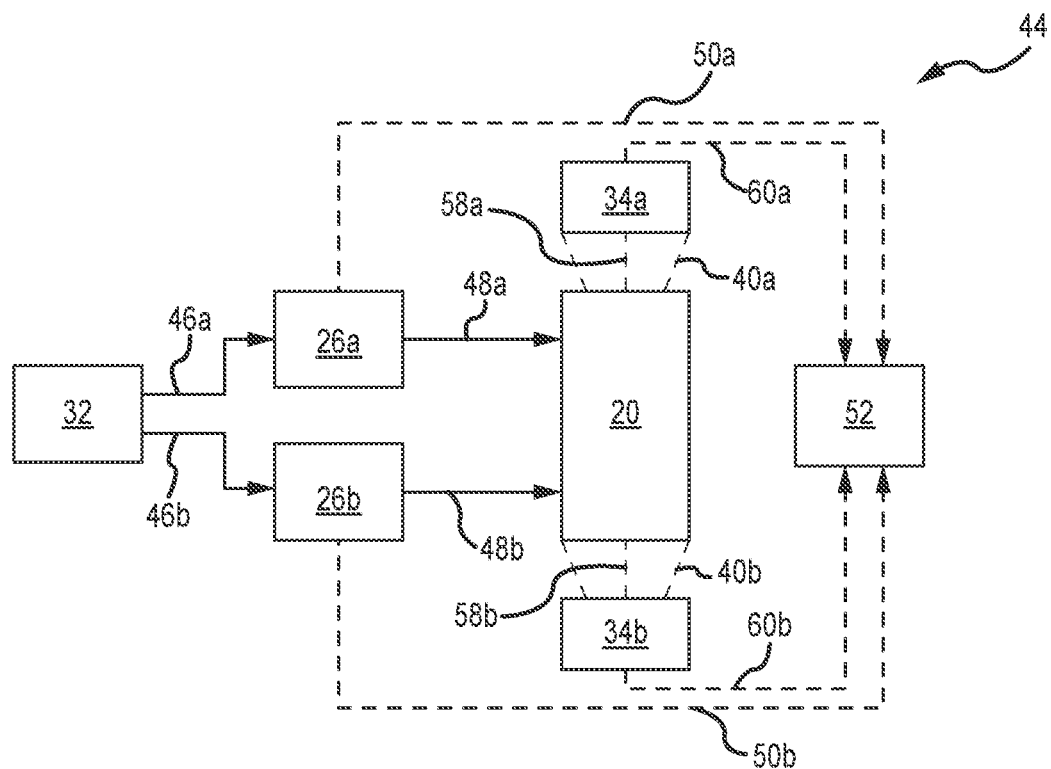
FIG. 7 is a block diagram view of the cargo handling system of FIG. 5, in accordance with various embodiments.

Referring now also to FIG. 7, a system 44 is illustrated in which the system controller 32 provides a command signal 46 to the PDUs 26, such as a first command signal 46*a* to the first PDU 26*a* and/or a second command signal 46*b* to the second PDU 26*b*. More specifically, the command signal 46 energizes the PDUs 26 and provides a motive force thereto, such as commanding the PDUs 26 to spin in a first direction and/or at what speed to do so, and/or to spin in a second direction opposite the first direction and/or at what speed to do so, and/or to rotate in orientation relative to the conveyance surface 22. As a result, the command signals 46 from the system controller 32 to the PDUs 26 cause motive forces to act upon the PDUs 26, in various embodiments.

In various embodiments, the motive force(s) acting on the PDUs 26 impart a force 48 on the ULD 20, such as the first PDU 26*a* imparting a first force 48*a* on the ULD 20, and/or the second PDU 26*b* imparting a second force 48*b* on the ULD 20. After overcoming any coefficients of friction in the conveyance surface 22 and/or the conveyance rollers 24 (and/or other), the force 48 causes the ULD 20 to move about the conveyance surface 22, including in response to the command signal 46 from the system controller 32, in various embodiments.

In various embodiments, a force parameter 50 is proportional and/or related to the force 48, such as measuring the amount of force 48 imparted from the PDU 26 to the ULD 20. For example, in various embodiments, a first force parameter 50*a* measures a first amount of the first force 48*a* imparted from the first PDU 26*a* to the ULD 20, and/or a second force parameter 50*b* measures a second amount of the second force 48*b* imparted from the second PDU 26*b* to the ULD 20. In various embodiments, the force parameter 50 comprises an electrical current and/or voltage applied to the PDU 26 by the system controller 32.

Figure 8:
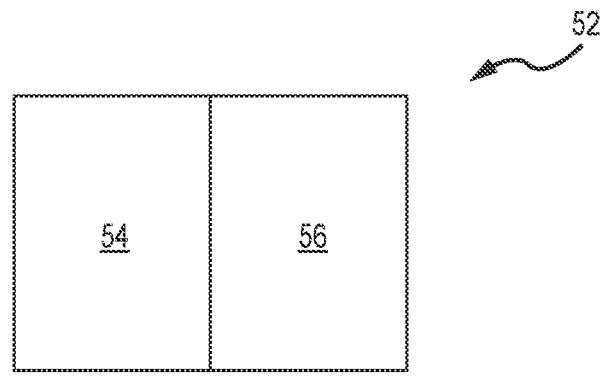
FIG. 8 is a block view of a system integrator comprising one or more processors and one or more tangible, non-transitory memories, in accordance with various embodiments.

In various embodiments, the force parameter 50 is transmitted by and/or from the PDU 26 to a system integrator 52, as shown in FIG. 7, comprising one or more processors 54 and one or more tangible, non-transitory memories 56, as shown in FIG. 8 and described further herein. For example, in various embodiments, the first force parameter 50*a* is transmitted by and/or from the first PDU 26*a* to the system integrator 52, and/or the second force parameter 50*b* is transmitted by and/or from the second PDU 26*b* to the system integrator 52.

As the ULD 20 moves within a sensing range of one of the sensors 34, the sensor 34 measures an acceleration 58 of the ULD 20 within a sensing zone 40. For example, as the ULD 20 moves within the first sensing zone 40*a* of the first sensor 34*a*, the first sensor 34*a* measures and/or determines a first acceleration 58*a* of the ULD 20 within the first sensing zone 40*a*. Likewise, as the ULD 20 moves within the second sensing zone 40*b* of the second sensor 34*b*, the second sensor 34*b* measures and/or determines a second acceleration 58*b* of the ULD 20 within the second sensing zone 40*b*.

In various embodiments, an acceleration parameter 60 is proportional and/or related to the acceleration 58, such as measuring an amount of acceleration 58 of the ULD 20 along the conveyance surface 22. For example, in various embodiments, a first acceleration parameter 60*a* reflects a first acceleration 58*a* of the ULD 20 within the first sensing zone 40*a*, and/or a second acceleration parameter 60*b* reflects a second acceleration 58*b* of the ULD 20 within the second sensing zone 40*b*.

In various embodiments, the acceleration parameter 60 is transmitted by and/or from the sensor 34 to the system integrator 52. For example, in various embodiments, the first acceleration parameter 60*a* is transmitted by and/or from the first sensor 34*a* to the system integrator 52, and/or the second acceleration parameter 60*b* is transmitted by and/or from the second sensor 34*b* to the system integrator 52.

While the command signals 46 are shown separately in the embodiment of FIG. 7 (e.g., the first command signal 46*a* and the second command signal 46*b*), there can be a single command signal 46 within the system 44. While the PDUs 26 are shown separately in the embodiment of FIG. 7 (e.g., the first PDU 26*a* and the second PDU 26*b*), there can be a single PDU 26 within the system 44. While the sensors 34 are shown separately in the embodiment of FIG. 7 (e.g., the first sensor 34*a* and the second sensor 34*b*), there can be a single sensor 34 within the system 44. While the sensing zones 40 are shown separately in the embodiment of FIGS. 6-7 (e.g., the first sensing zone 40*a* and the second sensing zone 40*b*), there can be a single sensing zone 40 within the system 44. In various embodiments, various parts of the system controller 32, the PDUs 26, the sensors 34, and/or the system integrator 52 can be combined, including into combinations of one another (e.g., in various embodiments, the system controller 32 includes the system integrator 52 and/or vice versa; the PDUs 26 include one or both of the system controller 32 and/or system integrator 52; the PDUs 26 include the sensors 34, etc.). In various embodiments, various combinations of the foregoing are utilized.

Referring now also to FIG. 8, the system integrator 52, which receives the first force parameter 50*a* from the first PDU 26*a*, the second force parameter 50*b* from the second PDU 26*b*, the first acceleration parameter 60*a* from the first sensor 34*a*, and the second acceleration parameter 60*b* from the second sensor 34*b*, comprises the one or more processors 54 and the one or more tangible, non-transitory memories 56 capable of implementing digital or programmatic logic. In various embodiments, for example, the one or more processors 54 comprise one or more of an application specific integrated circuit (ASIC), digital signal processor (DSP), field programmable gate array (FPGA), general purpose processor, and/or other programmable logic device, discrete gate, transistor logic, or discrete hardware components, etc., and the one or more tangible, non-transitory memories 56 store machine-readable instructions that are implemented by the one or more processors 54 for performing various functions, such as estimating mass (e.g., weight) in cargo handling systems and methods, such as claimed, disclosed, and enabled herein.

Figure 9:
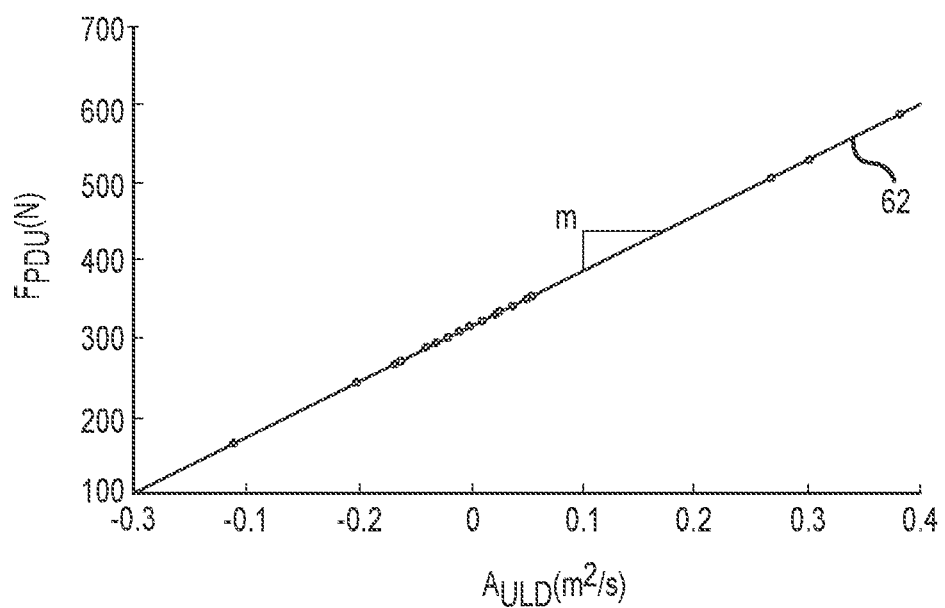
FIG. 9 is a linear regression graph of ordered pairs of force parameters of PDUs and acceleration parameters of ULDs used to estimate the mass (e.g., the weight) of the ULDs, in accordance with various embodiments.

In various embodiments, the system integrator 52 is programmed to arrange the first force parameter 50a and the first acceleration parameter 60a as a first ordered pair, such as (first force parameter 50a, first acceleration parameter 60a), as well as the second force parameter 50b and the second acceleration parameter 60b as a second ordered pair, such as (second force parameter 50b, second acceleration parameter 60b). As additional PDUs 26 and/or additional sensors 34 send additional force parameters 50 and additional acceleration parameters 60 to the system integrator 52, the system integrator 52 arranges additional ordered pairs, in various embodiments. In various embodiments, the system integrator 52 is programmed to plot the ordered pairs, such as the first ordered pair and the second ordered pair, on an x-y graph, with each ordered pair corresponding to a dot on the graph, such as shown in FIG. 9, with acceleration parameters 60 of the ULDs 20 plotted along the x-axis as corresponding to the accelerations 58 of the ULD 20 within a sensing zone 40, and force parameters 50 of the PDUs 26 plotted along the y-axis as corresponding to the forces 48 applied by the PDUs 26.

In various embodiments, the system integrator 52 is further programmed to perform regression analysis on the ordered pairs, such that a regressive slope m of the plotted line 62 corresponds to an estimated mass (e.g., weight) of the ULD 20 in accordance with Newton's Second Law, F=m*a—i.e., (force 48)=(mass)*(acceleration 58) and solving for mass, the mass of the ULD 20, not accounting for friction of the conveyance surface 22 and/or conveyance rollers 24.

In various embodiments, the regression analysis is a single variable regression analysis, such as solving for the mass of the ULD 20. In various embodiments, the regression analysis is a multi-variable regression analysis, such as solving for the mass of the ULD 20 and/or the friction of the conveyance surface 22 and/or conveyance rollers 24. In various embodiments, the mass of the ULD 20 is related to various measured quantities over time. For example, in various embodiments, mass=function of (force[0], . . . , force[T], acc[0], . . . , acc[T], loc[0], . . . , loc[T], and P), where force[i] is a force 48 measured at time step i, acc[i] is the acceleration 58 measured at time step i, loc[i] is a position of the ULD 20 along the conveyance surface 22 measured at time step i, and P is a set of tuning parameters.

Figure 10:
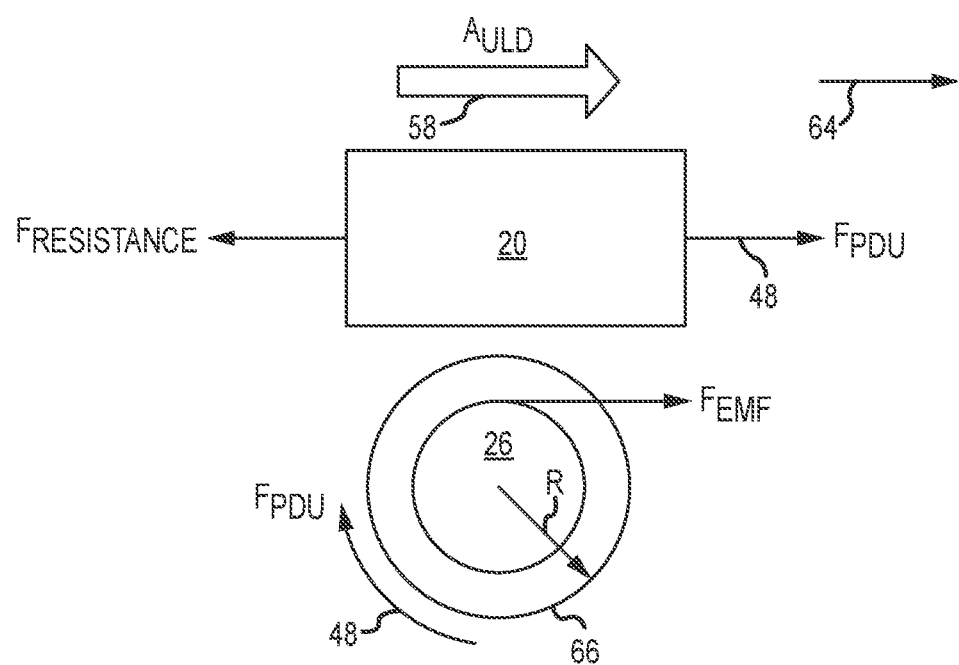
FIG. 10 is a force diagram of interactions between a ULD and a PDU, in accordance with various embodiments.

Referring now also to FIG. 10, a force analysis of interactions between the ULD 20 and the PDU 26 is provided. More specifically, the forces 48 applied by the PDU 26 (i.e., $F_{PDU}$) overcome the resistance forces of the conveyance surface 22 and/or the conveyance rollers 24 (i.e., $F_{RESISTANCE}$) as the ULD 20 starts, and/or continues, to move in an indicated direction 64. In addition, the forces 48 acting on the PDU 26 (i.e., $F_{PDU}$) are balanced by an electromagnetic force ($F_{EMF}$), that is to say the torque of the motor 30 of the PDU 26. The electromagnetic force ($F_{EMF}$) converts the internal torque of the motor 30 to an external force 48 that acts on the ULD 20, such as converting torque to force 48 based on a radius R of a gearbox 66 of the PDU 26. Also in various embodiments, the PDUs 26 include the controller 28 and the motor 30 (shown in FIG. 4), including sensing componentry for detecting and outputting the force 48 generated by the motor 30 of the PDU 26.

As described, the acceleration 58 of the ULD 20 is measured using the sensors 34 as the ULD 20 passes into a sensing zone 40 of the sensor 34. In various embodiments, multiple accelerations 58 are measured.

In various embodiments, the conveyance surface 22 is assumed to be parallel or approximately parallel to a ground surface on which the aircraft 10 rests while the ULDs 20 are moved about the conveyance surface 22 by the PDUs 26 and/or while the masses of the ULDs 20 are calculated. However, if the conveyance surface 22 is not level or substantially level, and because the PDUs 26 can be significantly massive, an angle of the conveyance surface 22, if not accounted for, could alter the mass calculations by the system integrator 52. Accordingly, the system integrator 52 receives one or more level indications from one or more level sensors relating to the latitude and/or longitudinal pitch of the conveyance surface 22 in order to adjust the mass calculations accordingly, in various embodiments. For example, the system integrator 52 accounts for level indications when analyzing the force parameters 50 detected by the sensors 34, in various embodiments. In various embodiments, multiple level indications allow the system integrator 52 to account for multiple pitch variations in the conveyance surface 22 when calculating the mass—such as, for example, accounting for at least one or more of latitudinal corrections and/or longitudinal corrections when warranted by pitch angle determinations, or estimates, of the conveyance surface 22, in various embodiments. In various embodiments, angle accommodations are done by at least one of direct and/or indirect measurements.

In various embodiments, a single PDU 26 or multiple PDUs 26 are utilized. In various embodiments, a single sensor 34 or multiple sensors 34 are utilized. In various embodiments, a single sensing zone 40 or multiple sensing zones 40 are utilized. In various embodiments, a single command signal 46 or multiple command signals signals 46 are utilized. In various embodiments, a single force 48 or multiple forces 48 are used. In various embodiments, a single force parameter 50 or multiple force parameters 50 are used. In various embodiments, a single acceleration 58 or multiple accelerations 58 are used. In various embodiments, a single acceleration parameter 60 or multiple acceleration parameters 60 are used. In various embodiments, at least one of the PDU 26, the system control 32, the sensor 34, and/or the system integrator 52 comprise various parts of one another and/or a common control mechanism. In various embodiments, various combinations of the foregoing are utilized.

Figure 11:
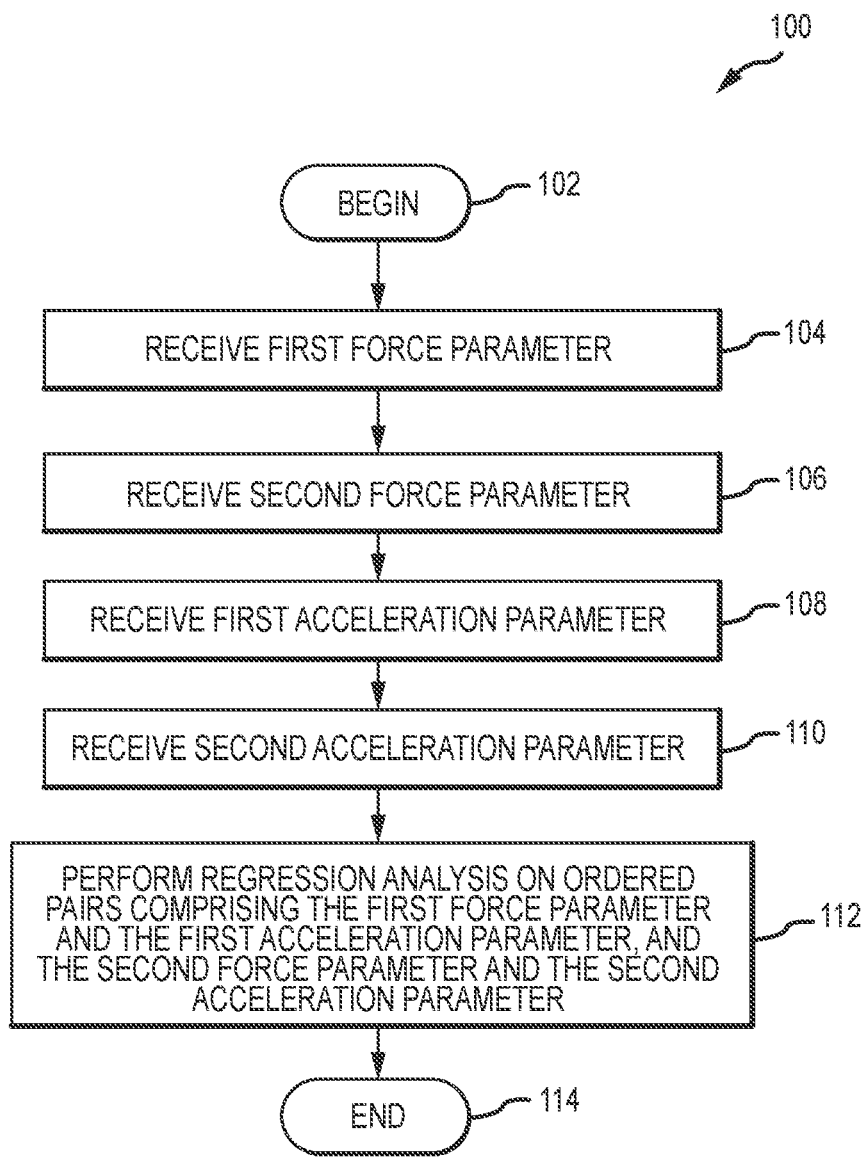
FIG. 11 is a flowchart of a method for estimating a mass of a ULD on-board a vessel configured to transport the ULD, such as using the embodiments of FIGS. 1-10, in accordance with various embodiments.

Referring now also to FIG. 11, a method 100 begins in a step 102, after which the system integrator 52 receives the first force parameter 50a from the first PDU 26a at a step 104, the first force parameter 50a being proportional to the first force 48a applied to the unit load device 20 by the first power drive unit 26a in communication with the conveyance surface 22 of the aircraft 10. Likewise, the system integrator 52 receives the second force parameter 50b from the second PDU 26b at a step 106, the second force parameter 50b being proportional to the second force 48b applied to the unit load device 20 by the second power drive unit 26b in communication with the conveyance surface 22 of the aircraft 10.

In a step 108, the system integrator 52 receives the first acceleration parameter 60*a* from the first sensor 34*a*, the first acceleration parameter 60*a* being proportional to the first acceleration 58*a* applied to the unit load device 20 when the unit load device 20 passes into a first sensing zone 40*a* of the first sensor 34*a*. Likewise, in a step 110, the system integrator 52 receives the second acceleration parameter 60*b* from the second sensor 34*b*, the second acceleration parameter 60*b* being proportional to the second acceleration 58*b* applied to the unit load device 20 when the unit load device 20 passes into a second sensing zone 40*b* of the second sensor 34*b*. In a step 112, the system integrator 52 performs regression analysis on order pairs of (the first force parameter 50*a*, the first acceleration parameter 60*a*) and (the second force parameter 50*b*, the second acceleration parameter 60*b*) to calculate the mass (e.g., the weight) of the ULD 20 while the unit load device 20 is on-board the aircraft 10, after which the method 100 ends at a step 114.

In various embodiments of the method 100, the unit load device 20 is rejected from the conveyance surface 22 of the aircraft 10 based on the mass of the unit load device 20, such as if the mass of the unit level device 20 does not match an expected mass of the unit load device 12, such as indicated in the load plan for the conveyance surface 22. In various embodiments of the method 100, the unit load device 20 is removed from the conveyance surface 22 of the aircraft 10 based on the mass of the unit load device 20, such as if the mass of the unit level device 20 does not match an expected mass of the unit load device 12, such as indicated in the load plan for the conveyance surface 22. In various embodiments of the method 100, a system response is generated if the mass of the unit load device 20 does correspond to an expected mass of the unit load device 20, the system response comprising, for example at least one of rejecting the unit load device 20 from the conveyance surface 22, removing the unit load device 20 from the conveyance surface 22, re-positioning the unit load device 20 on the conveyance surface 22, and/or generating an alert based on the mass of the unit load device 20, in various embodiments.

In various embodiments of the method 100, the regression analysis is a single variable regression analysis and/or a multi-variable regression analysis. In various embodiments of the method 100, the system integrator 52 is configured to perform the regression analysis before the unit load device 20 is placed in the stowage position on the conveyance surface 22 of the aircraft 10.

In various embodiments, if the calculated mass of the ULD 20 is not what was expected for the ULD 20 and/or within a reasonable tolerance therefrom (e.g., plus or minus approximately 5-25%, or 10-20%, and wherein approximately, as used in this context only, refers only to 5%), the system 44 generates a response. For example, a system response includes at least one or more of rejecting and/or removing the ULD 20 from the conveyance surface 22 of the vessel based on the mass of the ULD 20, such as by not placing the ULD 20 in a stowage position of the aircraft 10, moving and/or re-positioning the ULD 20 to a different part of the conveyance surface 22, and/or moving the ULD 20 from the conveyance surface 22 and/or the vessel, in various embodiments. In various embodiments, the PDUs 26 effectuate the system response, such as by moving the ULD 20 based on the system response. In various embodiments, the system response includes alerting an operator, such as with an auditory or visual or other signal, whom may then further effectuate the system response, such as by controlling further positioning of the ULD 20 via the PDUs 26, etc. In various embodiments, the system response is effectuated if the mass of the ULD 20 does not match an expected mass of the ULD 20, such as by removing the ULD 20 from the conveyance surface 22 of the vessel, such as the aircraft 10, based on the mass of the ULD 20.

In various embodiments, if the calculated mass of the ULD 20 is not what was expected for the ULD 20 and/or within a reasonable tolerance therefrom (e.g., plus or minus approximately 5-25%, or 10-20%, and wherein approximately, as used in this context only, refers only to 5%), the ULD 20 is rejected by the system 44 and/or off-loaded or moved (temporarily and/or permanently) from the conveyance surface 22 and/or the aircraft 10, in various embodiments. Such confirmatory mass/weight checks keep the load plan intact and the aircraft 10 safe. In various embodiments, the estimation of the mass (e.g., the weight) of the ULD 20 is performed while the ULD 20 is on the conveyance surface 22 and/or on-board the aircraft 10, including without a scale balance. Accordingly, technical effect is found in calculating the mass of the ULD 20 without using a scale and/or while the ULD 20 is on the conveyance surface 22 and within the fuselage 16 of the aircraft 10, which facilitates in creating and/or maintaining a load plan for the conveyance surface 22 of a vessel such as the aircraft 10. In various embodiments, the mass of the ULD 20 is calculated using regression analysis (linear or multi-variable), including using sensors 34 that are/were previously on the aircraft 10 prior to the weight calculation and/or that are/were previously on the aircraft 10 independent of the weight calculation to measure the accelerations 58, as well as measuring the force 48 applied by the PDUs 26 that move the ULDs 20. By estimating the actual mass (e.g., weight) of the ULD 20 while it is on-board the aircraft 10 allows tail tip to be avoided and/or minimized, and an improperly and/or overloaded conveyance surface 22 requires more power consumption and fuel than would otherwise be required to maintain controllable, efficient, and stable flight conditions by the aircraft 10, and/or introduces safety risks to the aircraft 10 and/or the ULDs 20, as well as to persons and equipment affected thereby.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C.

Systems, methods, and apparatus are provided herein. In the detailed description herein, references to "various embodiments," "one embodiment," "an embodiment," and "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular characteristic, feature, or structure is described in connection with an embodiment, it is submitted that it is within the knowledge of one skilled in the art to affect such characteristic, feature, or structure in connection with other embodiments, whether or not explicitly described. After reading the description, it will be apparent to one skilled in the relevant art(s) how to implement the disclosure in alternative embodiments.

Furthermore, no component, element, or method step in the present disclosure is intended to be dedicated to the public regardless of whether the component, element, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that an apparatus, article, method, or process that comprises a list of elements does not include only those elements, but may include other elements not expressly listed or inherent to such apparatus, article, method, or process.

What is claimed is:

1. A system for estimating a mass of a unit load device while on-board a vessel configured to transport the unit load device, comprising:
    a system controller configured to energize at least one power drive unit in communication with a conveyance surface of the vessel;
    wherein the at least one power drive unit having a controller and a motor is configured to apply a first force to the unit load device and transmit a first force parameter in proportion to the first force to a system integrator, and the at least one power drive unit configured to apply a second force to the unit load device and transmit a second force parameter in proportion to the second force to the system integrator;
    at least one sensor configured to measure a first acceleration of the unit load device in response to the unit load device moving into a sensing zone disposed about the conveyance surface of the vessel as a result of the first force and transmit a first acceleration parameter in proportion to the first acceleration to the system integrator, the at least one sensor further configured to measure a second acceleration of the unit load device in response to the unit load device moving into the sensing zone disposed about the conveyance surface of the vessel as a result of the second force and transmit a second acceleration parameter in proportion to the second acceleration to the system integrator; and
    the system integrator having a processor and a memory, the system integrator configured in electronic communication with the at least one power drive unit to receive the first force parameter and the second force parameter, and the system integrator also configured in electronic communication with the at least one sensor to receive the first acceleration parameter and the second acceleration parameter;
    wherein the system integrator is configured to calculate the mass of the unit load device while the unit load device is on-board the vessel by performing regression analysis on ordered pairs comprising the first force parameter and the first acceleration parameter, and the second force parameter and the second acceleration parameter.

2. The system for estimating the mass of the unit load device of claim 1, wherein at least one of the first force parameter comprises a first electrical current applied to the at least one power drive unit by the system controller and the second force parameter comprises a second electrical current applied to the at least one power drive unit by the system controller.

3. The system for estimating the mass of the unit load device of claim 1, wherein at least one of the first force parameter comprises a first electrical voltage applied to the at least one power drive unit by the system controller and the second force parameter comprises a second electrical voltage applied to the at least one power drive unit by the system controller.

4. The system for estimating the mass of the unit load device of claim 1, wherein the at least one sensor comprises at least one of a camera, a video capture device, a radar, a light sensor, a depth sensor, a position sensor, an infrared sensor, an ultrasound sensor, a light detection and ranging sensor, and a three-dimensional sensor.

5. The system for estimating the mass of the unit load device of claim 1, wherein the regression analysis is a single variable regression analysis.

6. The system for estimating the mass of the unit load device of claim 1, wherein the regression analysis is a multi-variable regression analysis.

7. The system for estimating the mass of the unit load device of claim 1, wherein the at least one power drive unit comprises the system integrator.

8. The system for estimating the mass of the unit load device of claim 1, wherein the vessel comprises an aircraft.

9. A method of estimating a mass of a unit load device while on-board a vessel configured to transport the unit load device, comprising:
    receiving, at a system integrator, a first force parameter in proportion to a first force applied to the unit load device by at least one power drive unit in communication with a conveyance surface of the vessel;
    receiving, at the system integrator, a second force parameter in proportion to a second force applied to the unit load device by the at least one power drive unit in communication with the conveyance surface of the vessel;
    receiving, at the system integrator, a first acceleration parameter in proportion to a first acceleration of the unit load device in response to the unit load device moving into a sensing zone disposed about the conveyance surface of the vessel as a result of the first force;
    receiving, at the system integrator, a second acceleration parameter in proportion to a second acceleration of the unit load device in response to the unit load device moving into the sensing zone disposed about the conveyance surface of the vessel as a result of the second force; and
    calculating, by the system integrator, the mass of the unit load device while the unit load device is on-board the vessel by performing regression analysis on ordered pairs comprising the first force parameter and the first acceleration parameter, and the second force parameter and the second acceleration parameter.

10. The method of estimating the mass of the unit load device of claim 9, further comprising generating a system response if the mass of the unit load device does not match an expected mass of the unit load device.

11. The method of estimating the mass of the unit load device of claim 10, wherein the system response comprises at least one of rejecting the unit load device from the conveyance surface, removing the unit load device from the conveyance surface, re-positioning the unit load device on the conveyance surface, and generating an alert based on the mass of the unit load device.

12. The method of estimating the mass of the unit load device of claim 9, wherein the regression analysis is a single variable regression analysis or a multi-variable regression analysis.

13. The method of estimating the mass of the unit load device of claim 9, further comprising:
performing the regression analysis before the unit load device is placed in a stowage position on the conveyance surface of the vessel.

14. The method of estimating the mass of the unit load device of claim 9, wherein the vessel comprises an aircraft.

15. A method of estimating a mass of a unit load device while on-board a vessel configured to transport the unit load device, comprising:
a non-transitory memory configured to store instructions; and
a processor in electronic communication with the memory, the processor configured to, in accordance with the instructions,
receive a first force parameter in proportion to a first force applied to the unit load device by at least one power drive unit in communication with a conveyance surface of the vessel;
receive a second force parameter in proportion to a second force applied to the unit load device by the at least one power drive unit in communication with the conveyance surface of the vessel;
receive a first acceleration parameter in proportion to a first acceleration of the unit load device in response to the unit load device moving into a sensing zone disposed about the conveyance surface of the vessel as a result of the first force;
receive a second acceleration parameter in proportion to a second acceleration of the unit load device in response to the unit load device moving into the sensing zone disposed about the conveyance surface of the vessel as a result of the second force; and
calculate the mass of the unit load device while the unit load device is on-board the vessel by performing regression analysis on ordered pairs comprising the first force parameter and the first acceleration parameter, and the second force parameter and the second acceleration parameter.

16. The method of estimating the mass of the unit load device of claim 15, further comprising generating a system response if the mass of the unit load device does not match an expected mass of the unit load device.

17. The method of estimating the mass of the unit load device of claim 16, wherein the system response comprises at least one of rejecting the unit load device from the conveyance surface, removing the unit load device from the conveyance surface, re-positioning the unit load device on the conveyance surface, and generating an alert based on the mass of the unit load device.

18. The method of estimating the mass of the unit load device of claim 15, wherein the regression analysis is a single variable regression analysis or a multi-variable regression analysis.

19. The method of estimating the mass of the unit load device of claim 15, further comprising:
performing the regression analysis before the unit load device is placed in a stowage position on the conveyance surface of the vessel.

20. The method of estimating the mass of the unit load device of claim 9, wherein the vessel comprises an aircraft.

* * * * *